Patented Feb. 10, 1925.

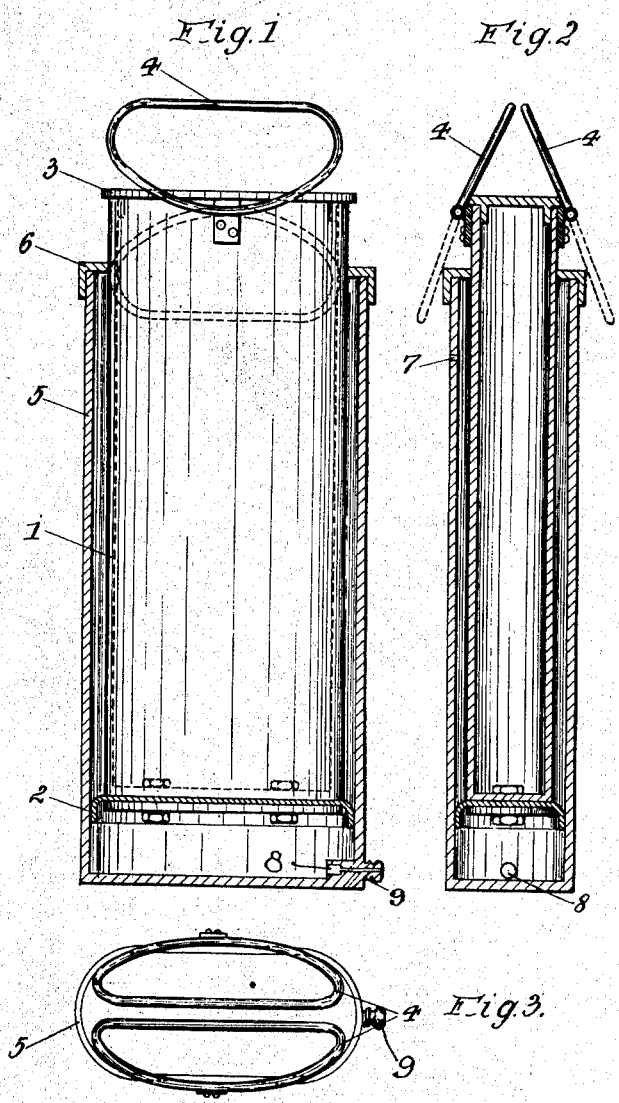

1,526,309

UNITED STATES PATENT OFFICE.

WILLY HOF, OF FRANKFORT-ON-THE-MAIN, GERMANY.

HAND AIR PUMP.

Application filed December 20, 1923. Serial No. 681,722.

*To all whom it may concern:*

Be it known that I, WILLY HOF, a citizen of German Republic, residing at Frankfort-on-the-Main, Germany, have invented certain new and useful Improvements in Hand Air Pumps, of which the following is a specification.

In the bicycle or motorcycle, auxiliary articles, such as an air pump, a spanner, rubber solution, rubber patches, etc. have to be carried loosely on the vehicle.

An object of the invention is to adapt a portable hand air pump to the carrying of various auxiliary articles therein, such as tools, etc.; and all the auxiliary articles can be easily taken along by the cyclist when he is leaving the bicycle or motorcycle.

The invention will be best understood from a consideration of the following detailed description taken in connection with the accompanying drawings forming a part of this specification, with the understanding that while on the drawing one embodiment of the invention is disclosed, the invention is not confined to any strict conformity with the showing of the drawings, but may be embodied in any manner which does not make a material departure from the salient features of the invention.

In the drawing:—

Fig. 1 shown the improved air pump in a central longitudinal section.

Fig. 2 is a central section taken at an angle of 90° with regard to the section shown in Fig. 1.

Fig. 3 is a plan view of Fig. 1.

The piston 1 which serves as a receptacle has at its lower end a leather cup 2 and it is closed at the upper end by a removable lid 3. The piston 1 is large in proportion to its depth so that all the commonly used auxiliary articles may be stored in the same.

On the upper end of the outside of the side walls of the piston 1 two handles 4 are hingedly mounted so that they may be laid down from the position of use shown in Figs. 1 and 2 into the position shown in dash lines in order to reduce the length of the pump. The pump barrel 5 has at its upper end a guide cap 6 for guiding the piston 1. This guide cap is preferably fixed by riveting. The pump barrel has an air hole 7, and an orifice 8 in a nipple 9 for connecting the pump with a pneumatic tire by means of a flexible tube.

It is to be noted that the pump barrel 5 and receptacle-forming piston 1 are not only of relatively large cross section and short length, but that, as a feature of the invention, they are of oblong cross section or flattened so that the longer transverse dimension or width of the piston 1 is just sufficient to enable it to receive the auxiliary article of greatest width which may be a spanner, and to receive all of such articles compactly.

Thus all of the usual tools and other auxiliary articles may be conveniently stored within the air pump, without the need of having, as commonly, a separate or special receptacle or bag. The air pump of the present invention, with the other auxiliary articles contained therein, may be conveniently carried on the vehicle, or may be removed therefrom and conveniently carried away by the owner, to prevent theft or unauthorized use of any of the auxiliary articles; it being noted in this connection that the pump as a whole has substantially the shape of a flat pocket book or billfold.

I claim:—

A portable hand air pump comprising a barrel, a tubular piston reciprocating in said barrel, closed at its inner end, and having a removable closure at its outer end, a plurality of handle bail members hinged to the sides of the outer end of the piston, movable to positions to permit removal of the closure and also movable toward one another across the end of the piston to serve together as an operating handle for the piston, said members when in the last-named position locking said closure to the piston, whereby the motion of the loose contents of the chamber of the piston cannot loosen or knock off the closure while the piston is being reciprocated.

In testimony whereof I affix my signature.

WILLY HOF.

Witnesses:
IRENE GIUSTI,
C. C. L. B. WYLES.